(12) United States Patent
Scherbarth (10) Patent No.: US 9,352,406 B2
(45) Date of Patent: May 31, 2016

(54) TOOTH MILLING CUTTER AND METHOD FOR MILLING THE TEETH OF TOOTHED GEAR ELEMENTS

(75) Inventor: Stefan Scherbarth, Bietigheim-Bissingen (DE)

(73) Assignee: Sandvik Intellectual Property AB, Sandviken (SE)

( * ) Notice: Subject to any disclaimer, the term of this patent is extended or adjusted under 35 U.S.C. 154(b) by 274 days.

(21) Appl. No.: 13/880,406

(22) PCT Filed: Oct. 14, 2011

(86) PCT No.: PCT/EP2011/068036
§ 371 (c)(1),
(2), (4) Date: Aug. 23, 2013

(87) PCT Pub. No.: WO2012/052367
PCT Pub. Date: Apr. 26, 2012

(65) Prior Publication Data
US 2013/0322974 A1 Dec. 5, 2013

(30) Foreign Application Priority Data
Oct. 22, 2010 (DE) .......................... 10 2010 042 835

(51) Int. Cl.
*B23F 5/20* (2006.01)
*B23F 1/06* (2006.01)
(Continued)

(52) U.S. Cl.
CPC ... *B23F 5/20* (2013.01); *B23F 1/06* (2013.01); *B23F 21/128* (2013.01);
(Continued)

(58) Field of Classification Search
CPC ........... Y10T 409/103816; Y10T 409/103975; Y10T 409/104134; Y10T 409/104611; Y10T 409/104293; Y10T 409/104452; Y10T 409/105883; Y10T 409/107791; Y10T 409/10795; Y10T 407/1745; Y10T 407/1725; B23F 1/06; B23F 5/20; B23F 5/202; B23F 5/22; B23F 5/24; B23F 5/27; B23F 21/122; B23F 21/126; B23F 21/128; B23F 21/14; B23F 21/146

USPC .......... 409/25, 26, 27, 28, 29, 30, 38, 50, 51; 407/25, 29
See application file for complete search history.

(56) References Cited

U.S. PATENT DOCUMENTS 1,133,516 A * 3/1915 Weaver ........................... 409/28
1,516,524 A 11/1924 Fellows
(Continued)

FOREIGN PATENT DOCUMENTS

DE 7287 7/1954
DE 10 2008 063 858 7/2010
(Continued)

OTHER PUBLICATIONS

English Translation of the International Preliminary Report on Patentability for PCT/EP2011/068036 dated May 2, 2013.
(Continued)

*Primary Examiner* — Daniel Howell
*Assistant Examiner* — Yasir Diab
(74) *Attorney, Agent, or Firm* — Morgan, Lewis & Bockius LLP (57) ABSTRACT

Method for milling a series of teeth of a toothed gear element with teeth in a straight line with a milling cutter rotatable about a milling cutter axis and having at its periphery interchangeable cutting inserts arranged such that, when the milling cutter is brought to the toothed gear element, they reach into gaps between adjacent teeth or generate these gaps, and a corresponding milling cutter. Cutting edges of mounted cutting inserts extend radially and perpendicularly relative to the milling cutter axis. During milling of the tooth profile, the milling cutter axis is aligned in a plane perpendicular to the longitudinal extent of the tooth back and, during entering of the cutting inserts, rotated about the milling cutter axis, into the surface or gaps between the teeth, and pivoted in this plane over an angular range covering all normals to the profile surface of the tooth to be produced.

16 Claims, 9 Drawing Sheets

(51) Int. Cl.
    *B23F 21/12* (2006.01)
    *B23F 21/14* (2006.01)

(52) U.S. Cl.
    CPC .............. *B23F 21/146* (2013.01); *B23F 5/202* (2013.01); *B23F 21/122* (2013.01); *B23F 21/14* (2013.01); *Y10T 407/23* (2015.01); *Y10T 407/235* (2015.01); *Y10T 409/10795* (2015.01); *Y10T 409/103975* (2015.01); *Y10T 409/104134* (2015.01); *Y10T 409/104293* (2015.01); *Y10T 409/104452* (2015.01); *Y10T 409/107791* (2015.01)

(56) References Cited

U.S. PATENT DOCUMENTS

| | | | | |
|---|---|---|---|---|
| 1,788,639 | A | * | 1/1931 | Stonebraker .................... 409/51 |
| 1,899,023 | A | | 2/1933 | Earl |
| 1,940,703 | A | * | 12/1933 | Stewart ........................... 409/55 |
| 2,126,004 | A | * | 8/1938 | Gleason ........................... 409/51 |
| 2,248,158 | A | * | 7/1941 | Boor ............................... 74/466 |
| 3,091,059 | A | * | 5/1963 | Cleff .............................. 451/120 |
| 3,618,459 | A | | 11/1971 | Moncrieff |
| 4,142,333 | A | * | 3/1979 | Fivian ............................. 451/47 |
| 4,565,474 | A | | 1/1986 | Charles |
| 4,720,220 | A | | 1/1988 | Bloch et al. |
| 4,750,848 | A | | 6/1988 | Adler |
| 6,609,858 | B1 | | 8/2003 | Francis et al. |
| 7,059,810 | B2 | | 6/2006 | Francis et al. |
| 2008/0206007 | A1 | | 8/2008 | Hughes |
| 2009/0162155 | A1 | * | 6/2009 | Wermeister ................... 407/114 |

FOREIGN PATENT DOCUMENTS

| | | |
|---|---|---|
| DE | 20 2010 002 303 | 7/2011 |
| JP | S58-132417 | 8/1983 |
| JP | S60-501052 | 7/1985 |
| JP | S63-68315 | 3/1988 |
| JP | H02-131813 | 5/1990 |
| JP | 2002-307236 | 10/2002 |
| JP | 2005-523170 | 8/2005 |
| WO | WO 03/089203 | 10/2003 |
| WO | 2006/053854 | 5/2006 |

OTHER PUBLICATIONS

International Search Report for PCT/EP2011/068036 dated Feb. 2, 2012.
German Search Report for 10 2010 042 835.3 dated Jun. 30, 2011.
Office Action (with English translation) for Japanese Application No. 2013-534267 dated Jul. 28, 2015.
Second Office Action (with English translation) for Japanese Application No. 2013-534267 dated Jan. 5, 2016.

* cited by examiner

TOOTH MILLING CUTTER AND METHOD FOR MILLING THE TEETH OF TOOTHED GEAR ELEMENTS

The present invention concerns a method of milling a row of teeth of a toothed gear element with a straight tooth configuration, with a milling cutter which is rotatable about a milling cutter axis and has at its periphery interchangeable cutting inserts which are so arranged that when the milling cutter is approached to the toothed gear element the cutting inserts engage into the gaps between adjacent teeth or generate those gaps.

Such a milling cutter is known for example from DE 10 2008 063 858. That known milling cutter is intended to be moved line-wise after or in the engagement movement into the respective tooth gap along the tooth, that is to say parallel to the tooth back, wherein the milling cutter axis is tilted after such a line pass in order to go along a new line in parallel relationship. That results in strips of a tooth profile, that extend parallel to the tooth back. Depending on the respective number and density of the lines which are covered in that case and which are respectively produced by more or less greatly pronounced tilting movement of the milling cutter axis relative to the tooth to be milled, that results in a tooth contour which is slightly faceted. It will be noted that the advantage of that known milling cutter is that, in contrast to other conventional milling methods, it is basically possible with such a method to produce different tooth profiles which can vary in a very wide range, with one and the same milling cutter, so that there is no need to change the milling cutter if another tooth shape is to be produced. In particular, it is also possible to produce arcuate tooth configurations with that milling cutter and the described method.

The cutting edges of the milling cutter which is used in that case respectively extend for that purpose through an angle differing markedly from 90° relative to the milling cutter axis, that is to say those cutting edges are not in a plane oriented perpendicularly to the milling cutter axis.

Toothed gear transmissions in practice very frequently also have teeth of a straight tooth configuration, in which therefore the tooth back extends along a straight line. To a certain extent that also includes so-called helical tooth configurations in which the gear back does at any event extend in plan view from above along a straight line, in which case in a side view it has either no curvature or only a slight curvature, that is to say for example in the case of gear wheels of large diameter and/or small width and with a large number of teeth. The tooth width or gear wheel width corresponds in that case to the length of the tooth back (in the case of helical tooth configurations also multiplied by the cosine of the angle between tooth back and axis of the gear wheel). The present invention aims in particular at rational production of such straight tooth configurations with at the same time a high quality in the profile configuration and the profile surface.

In addition other methods of milling the teeth of toothed gear elements are also known, using so-called blade heads which typically have cutting blades which are arranged on a circular arc and which extend in substantially axis-parallel relationship and which engage into the respective tooth gaps, wherein the cutting edge configuration either of the individual cutting blades or of the respective contour of a plurality of successively arranged blades corresponds to the desired tooth profile or tooth gap profile.

Another method of gear wheel production is also known, as a "hobbing method" or "hobbing milling".

Such methods however are relatively unproductive if respectively different tooth profiles are to be produced as, in the case of the blade heads, the cutting blades are each especially designed or adapted for a given tooth profile and have to be respectively changed or re-adjusted to produce a new profile. The hobbing milling cutters are also only ever designed for a given tooth profile.

With the first-mentioned milling method in contrast it is admittedly possible to produce a large number of different tooth profiles with one and the same milling cutter, but in that respect there is always the above-mentioned disadvantage that the tooth profile is more or less severely faceted.

In comparison with that state of the art the object of the present invention is to provide a method of milling teeth of a toothed gear element having the features set forth in the opening part of this specification, which besides high productivity also permits a very exact tooth profile shape without faceting and with which even relatively complex tooth profiles can be generated without changing or re-adjusting the cutting inserts that are mounted to the milling cutter.

That object is attained in that a milling cutter is used, in which the cutting inserts in their condition of being mounted to the milling cutter have at least one cutting edge extending radially and perpendicularly relative to the milling cutter axis and upon milling of the tooth profile the milling cutter axis is oriented in a plane perpendicularly to the longitudinal extent of the tooth back and during the engagement movement of the cutting inserts which rotate about the milling cutter axis into the surface or tooth gaps of a toothed gear element it is pivoted in said plane over an angle which covers the range of all normals to the desired profile surface.

As already mentioned the method according to the invention is primarily intended for and is advantageous in relation to teeth with a rectilinear tooth configuration, that is to say teeth whose tooth back extends along a straight line.

Such teeth are frequently to be found on straight-toothed gear wheels, racks and other toothed gear elements. Some helically toothed transmission elements, in particular on racks and gear wheels of a large radius and with a large number of teeth, can also be produced by means of the method according to the invention.

Straight teeth are also to be found on so-called bevel gear wheels whose envelope surface is a conical surface, more specifically to the extreme of a cone angle of 90°, relative to the cone axis. In the last-mentioned case the bevel gear is a flat level gear wheel whose teeth can extend radially or also at an angle relative to the radial direction. Even in the case of a relatively small cone angle the straight teeth can extend either in a plane containing the cone axis or also inclinedly relative to such a plane, in which case however the tooth backs lie on the same cone surface and the tooth bottom surfaces also all lie on a common cone surface which however is of a generally somewhat smaller cone angle so that the tip of the notional cone surface of the tooth backs coincides with the tip of the notional cone surface of the tooth bottom surfaces. The individual teeth are then of a varying tooth height which continuously decreases from the radially further outwardly disposed portion to the radially inward portions, in accordance with a decreasing gap width between two cone surfaces whose tips coincide but which involve different cone angles. In principle however it is also possible to envisage bevel gears in which the tooth bottom surfaces define the same cone angle as the tooth backs. In that case the teeth would be of a constant height which is the same throughout. As the number of teeth on a given bevel gear is constant the tooth profile becomes narrower from the radially outwardly disposed region to the radially inwardly disposed region.

In dependence on the diameter of the milling cutter and in dependence on the length of the respective teeth (measured parallel to the tooth back) the tooth profile can be produced in one or possibly also in two or more passes or milling operations.

In that respect a pivotable movement of the milling cutter axis relative to the toothed gear element does not necessarily signify an actual pivotal movement of the milling cutter axis in space, but instead the toothed gear element can also be suitably pivoted while the milling cutter axis retains its orientation in space in order as a result to achieve a relative pivotal movement of the milling cutter axis relative to the gear element or the tooth profile thereof. That applies in particular in the production of gear wheels which during production of the tooth arrangement for example can be simply rotated about their wheel axis while the milling cutter is only moved with a translatory movement and the milling cutter axis retains its orientation.

The expression "pivotal movement of the milling cutter axis" therefore in accordance with the present invention embraces all relative pivotal movements between a toothed gear element and a milling cutter, irrespective of which of the elements involved is actually also pivoted in space or on or in a corresponding machine tool.

In that respect the translatory movement of the milling cutter generally has independently controllable axial and radial components in the plane perpendicularly to the tooth back and in relation to the milling cutter axis.

Further preferred configurations of the method according to the invention, the associated milling cutter and the corresponding cutting insert are set forth in the appendant claims.

Thus in accordance with a variant it is provided that during the engagement movement and the pivotal movement of the rotating milling cutter and the cutting inserts the toothed gear element is translatorally displaced in the direction of the row of teeth or is rotated about an axis of the toothed gear element insofar as the toothed gear element is a gear wheel, as was already explained hereinbefore.

In a further variant it is provided that the cutting inserts project radially from the outer periphery of the milling cutter main body and on mutually opposite sides have parallel cutting edges perpendicular to the milling cutter axis, wherein the mutually opposite cutting edges are respectively used successively for generating the flanks of adjacent teeth, which flanks are in opposite relationship to a toothed gap.

It is further provided in a variant that the cutting inserts additionally have a cutting edge (9) which is disposed in a cylindrical surface around the milling cutter axis and has components parallel to the milling cutter axis (21), wherein said additional cutting edge is used to generate the toothed gap bottom, by the milling cutter being approached to the gear element radially and perpendicularly to the plane defined by two adjacent tooth backs, wherein the milling cutter axis is respectively disposed perpendicularly to the currently generated surface segment of the tooth profile.

In concrete terms a method according to the invention for the production of the tooth profile delimiting a tooth gap could comprise the following steps:

a) producing a groove in the cylindrical surface of a gear wheel blank (20) by the milling cutter cutting the surface open with the cutting circle defined by the cutting inserts in a depth corresponding to the tooth height parallel to the axis (15) of the gear wheel (20), b) pulling the milling cutter out of the groove and feeding it in an axial position of the tooth back along which the profile is to be produced at the tip of a tooth delimiting the groove or a corresponding tooth gap, wherein the gear wheel is rotated into a position and the milling cutter is correspondingly tracked therewith so that the cutting edges (8) of the milling cutter are perpendicular to a normal to the radially outward end portion of the profile, and c) rotating the gear wheel and simultaneously tracking the milling cutter by axial and radial translation, wherein the milling cutter axis retains its orientation in space and the profile of the tooth is continuously produced.

With a suitable tooth width or with a suitable ratio in respect of milling cutter diameter to tooth width, the process of engagement movement and pivotal movement is repeated in at least one further plane parallel to the first plane.

In a variant for the production of bevel gears it is provided that the tooth back extends on a conical surface which is inclined relative to the axis of the conical surface.

In that case the angle of the conical surface, that is measured relative to the cone axis, is between 0 and 90°, preferably between 10° and 80°.

In concrete terms a method of producing bevel gears could comprise the following steps:

a) producing a groove in the conical surface of a gear wheel blank (20) by the milling cutter cutting the surface open with the cutting circle defined by the cutting inserts in a depth corresponding to the tooth height at an angle of inclination to the cone axis, that corresponds to the cone angle of the tooth bottom of a bevel gear to be produced, b) pulling the milling cutter out of the groove and feeding the milling cutter cutting circle in an axial position of the tooth back at which the profile is to be produced at the tip of a tooth delimiting the groove or a corresponding tooth gap, wherein the gear wheel is rotated about the cone axis and the milling cutter is correspondingly tracked therewith so that the cutting edges (8) of the milling cutter are perpendicular to a normal to the radially outward end portion of the profile, and c) rotating the gear wheel and simultaneously tracking the milling cutter by axial and radial translation, with respect to the milling cutter axis, wherein the milling cutter axis retains its orientation in space and the profile of the tooth is continuously produced.

In that case the axial and radial translation of the milling cutter, that is related to the milling cutter axis, corresponds to a movement at an approximately constant spacing relative to a cone tip, lying on the cone axis, of the cone surfaces of the bevel gear to be produced, wherein the milling cutter axis respectively extends parallel to a tangent to the cone surface.

Here too it is to be noted that the milling cutter can indeed perform only a translatory, axial and radial movement in space, while at the same time the bevel gear or the bevel gear blank is also rotated.

The corresponding milling cutter for the production of tooth profiles has a rotatable, rotationally symmetrical main body and recesses at a periphery of the main body, in which cutting inserts are received, wherein the cutting inserts have cutting edges which are disposed in a radial plane and which extend radially and which extend in the radial direction by at least 6 mm beyond the peripheral surface of the portion of the main body, that has the recesses.

The tooth profile is accordingly generated by cutting edges which are in a plane perpendicularly to the milling cutter axis.

The corresponding cutting insert for a milling cutter for use in a method as was described hereinbefore is in the form of a tangential reversible cutting insert which in the plan view onto the relief surface is of an elongate parallelogram shape of a length exceeding the width by at least twice and having a central fixing bore, wherein the edge of the fixing bore is at a spacing of at least 12 mm from the ends in the longitudinal direction of the parallelogram.

In that case the cutting insert over at least 8 mm of its cutting portions provided at the longitudinal ends of the parallelogram can have a tangential rake surface with two parallel cutting edges and relief surfaces adjoining same, which include an angle of less than 90 degrees with the rake surface.

To sum up a method of milling a row of teeth of a toothed gear element with a straight tooth configuration, wherein the toothed gear element is a bevel gear, with a milling cutter which is rotatable about a milling cutter axis and has at its periphery interchangeable cutting inserts which are so arranged that when the milling cutter is approached to the toothed gear element the cutting inserts engage into the gaps between adjacent teeth or generate those gaps, can be characterised in that a milling cutter is used, in which the cutting inserts in their condition of being mounted to the milling cutter have at least one cutting edge extending radially and perpendicularly relative to the milling cutter axis, wherein upon milling of the tooth profile the milling cutter axis is oriented in a plane perpendicularly to an edge of the tooth back, that delimits the desired profile surface, and during the engagement movement of the cutting inserts which rotate about the milling cutter axis into the surface or tooth gaps of a toothed gear element it is pivoted in said plane over an angular range which covers the range of all normals to the profile surface of the tooth to be produced.

As the cutting inserts on the milling cutter move on a circle whose diameter depends on the milling cutter specifically used, and as, with the method according to the invention, during the pivotal movement of the milling cutter axis, the deepest point of the tooth gap is reached by the respective radially outer cutting edge portions of the cutting inserts, only at one point in the tooth gap, it depends on the diameter of the milling cutter and the length of the respective teeth whether the circular arc, along which the free ends of the cutting inserts of the milling cutter pass, is sufficiently close to the bottom of the tooth gap to form the complete tooth profile at both ends of the tooth, that is to say over the full tooth width. If required, the milling cutter axis, when the cutting inserts have their deepest engagement position in the tooth gap, can also be displaced parallel to the longitudinal extent of the tooth back in order to generate the bottom of the tooth gap and any protuberances at the bottom of the tooth gap, wherein it is precisely to generate protuberances of an undercut configuration that the milling cutter axis can be tilted more or less between those two or more milling operations (in parallel relationship with the tooth back). In particular the first clearance or the first gap can be generated in the (initially still smooth or unstructured) surface of the toothed gear element by such a milling operation, and then, starting therefrom, the profile of the adjoining teeth is generated with the method according to the invention.

The actual tooth profile however is produced with a fixed position for the milling cutter axis relative to the longitudinal extent of the tooth back, in which case however that milling operation can also be repeated at two or more positions, displaced along the tooth back, in respect of the milling cutter axis, with pivotal movement of the milling cutter axis and generation of the tooth gap or engagement into the tooth gap, if a correspondingly large tooth width in relation to the cutting circle defined by the cutting inserts of the milling cutter requires that.

In that case the pivotal movement of the milling cutter axis is effected for example about a point outside the milling cutter on a prolongation of the milling cutter axis, wherein that pivotal movement can at the same time also be superposed by a translatory movement of the respective tooth relative to the milling cutter.

In the preferred configuration of the method however the toothed gear element is rotated about an axis extending parallel to the tooth back while the milling cutter retains the orientation of its axis in space, but at the same time is displaced with a translatory movement parallel and perpendicularly to its axis (and also perpendicularly to the longitudinal extent of the tooth back) to follow the movement of the toothed gear element and in that case to mill the tooth profile. In particular, in the case of gear wheels with a straight tooth configuration, the pivot axis is the axis of the gear wheel. In the case of helically toothed gear wheels, the axis of rotation of the gear wheel however differs from the direction of the tooth back, in which case the rotation of the gear wheel is nonetheless effected about its axis of rotation, but the milling cutter axis is moved with a translatory movement in a plane perpendicular to the tooth back.

As already mentioned that milling operation on the profile of a tooth can be repeated at various positions over the width of the tooth, particularly if the situation involves relatively wide teeth, in which case the relationship is to be respectively produced in regard to the radius or diameter of the milling cutter. For example in many practical cases teeth up to a width which is at a maximum 30% of the milling cutter radius can be readily milled in a single pass with the method according to the invention, if then the region which is no longer engaged by the milling cutter at the end portions of the respective tooth is sufficiently close to the tooth gap bottom and that region does not come into engagement upon rolling movement of the teeth on oppositely disposed toothed gear elements.

If the tooth width is markedly greater than 30% of the milling cutter radius then the corresponding milling operations have to be respectively repeated at a spacing of for example 30% or less of the milling cutter radius along the tooth width. (The tooth width is measured in each case parallel to the tooth back).

Desirably the corresponding milling cutter is of such a configuration that the cutting inserts project radially from the outside periphery of the milling cutter body, sufficiently far, for example by at least the tooth root height, and on their two mutually opposite sides have parallel cutting edges which are perpendicular to the milling cutter axis so that the oppositely disposed cutting edges can be respectively used successively for generating the flanks, in opposite relationship at a tooth gap, of adjacent teeth. The milling cutter axis is accordingly pivoted still further when using the cutting edges which face away from the front end of the milling cutter, than in the production of a tooth profile with the oppositely disposed cutting edges, as the rearward cutting edges (that are remote from the front end) of the cutting inserts must each be oriented perpendicularly to a normal to the profile surface region which is just to be produced. It will be appreciated that the tooth root heights can fluctuate within wide limits, in which respect the range which is relevant in practice is between 1 mm and 150 mm tooth root height. Alternatively it is also possible to relate the radial distance by which the cutting edges project beyond the outside periphery of the milling cutter to the milling cutter axis as the size or the radius or diameter of the milling cutter used is generally adapted to a certain range of gear wheel sizes and corresponding tooth root heights. Expressed in such terms the above-mentioned radial projecting distance of the cutting edges should be between 2% and 20% of the milling cutter radius, preferably between 5% and 16% and generally more than 8%.

Desirably at their free ends the cutting inserts also have an end cutting edge which lies in a cylindrical surface around the milling cutter axis and accordingly has components parallel to that axis, wherein that additional end cutting edge is used for generating the tooth gap bottom, by the milling cutter being approached to the gear element radially and perpendicularly to the plane defined by two adjacent tooth backs, and possibly also being moved through the tooth gap parallel to the direction of the tooth backs.

The corresponding milling cutter for the production of tooth profiles, which has a rotatable, rotationally symmetrical main body and recesses in a periphery of the main body, in which cutting inserts are received, attains the object of the invention in that the cutting inserts lie in a radial plane and have cutting edges which extend radially and which in addition extend in the radial direction by at least the tooth root height beyond the peripheral surface of the portion of the main body, that has the recesses.

The possible tooth root height and the radial projecting distance related to the milling cutter radius have already been described in greater detail hereinbefore.

Such a radial projecting dimension is necessary as the ends of the cutting inserts, that project in the radial direction, must be engaged into the tooth gaps and in addition the milling cutter axis on the side of the milling cutter main body is to be tilted towards the toothed gear element without the milling cutter main body touching one of the adjacent teeth, which would prevent further engagement movement of the teeth into the tooth gap or the necessary tilting movement of the milling cutter axis.

In the preferred embodiment in the plan view onto the rake surfaces the associated cutting inserts are of a narrow rectangular shape, wherein the narrow side corresponds at a maximum to the width of the tooth gap at the bottom of the toothed gear element and wherein the longitudinal sides of the rectangular rake surface have two parallel cutting edges, wherein the cutting inserts are sufficiently long so that in their condition of being mounted to a milling cutter main body they respectively project beyond the periphery of the milling cutter by at least the tooth root height mm.

Preferably the projection distance is 1.1 times the tooth root height and is thus matched to the height of the teeth to be produced therewith. In the case of larger tooth root heights the projection dimension beyond the milling cutter main body is respectively at least 10%, preferably at least 15% more than the tooth root height.

Further advantages, features and possible uses of the present invention will be clearly apparent from the description hereinafter of a preferred embodiment and the accompanying Figures in which:

FIGS. 1A, B and C show three different views of a milling cutter according to the invention, wherein fitted cutting inserts can also be seen in FIGS. 1B and C, FIGS. 2A and B show a plan view and a side view of a cutting insert according to the invention, FIGS. 3 to 5 diagrammatically show the production process for a tooth profile by pivotal movement of the milling cutter axis and simultaneous radial movement with respect to the gear wheel axis in accordance with a first method.

FIG. 1A shows a front-end plan view of a milling cutter main body 10 while FIGS. 1B and C show it in two side views turned through 90° relative to each other. The milling cutter main body generally identified by 10 comprises a frustoconical main portion 1, a rearward cylindrical fixing projection 2 and a front cylindrical enlargement 3, at the front end of which in the periphery there are provided receiving pockets 4 for cutting inserts 5 in this case being a total of twelve. The number of cutting inserts can vary within wide limits, for example between 4 and 40.

The plan view in FIG. 1A shows cutting inserts 5 which are fitted into two of the receiving pockets 4 and which are of a parallelogram shape in the side plan view onto the relief surface and which each have at least one, in this case central, fixing bore 22 and which are fixed by way of screws 6 engaging into corresponding bores 7 provided in the seat surfaces. An arrow P shows the intended direction of rotation of the milling cutter in operation. The cutting inserts are in the form of reversible cutting inserts each having two pairs of parallel profile cutting edges 8 and an end cutting edge 9.

Figure 1:
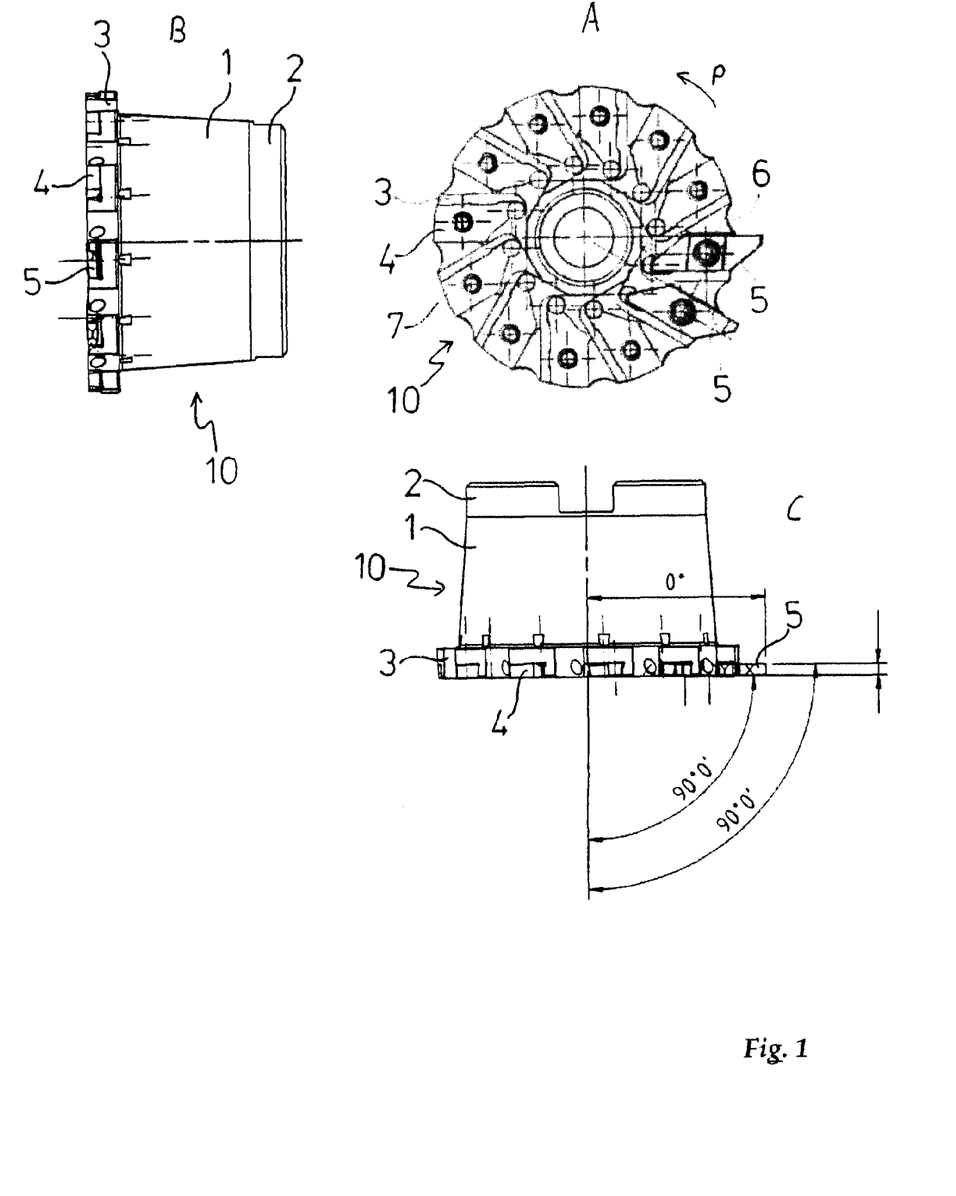

Even if this can only be seen by men skilled in the art in FIG. 1, the radially inward end of the receiving seat at any event has a respective relief recess, within which the respectively inactive, inwardly disposed cutting edges 8, 9 of the cutting insert 5 are freely disposed and are thus protected from wear while the active ends of the cutting inserts respectively project beyond the periphery of the cylindrical enlargement 3 by at least the tooth root height, for example 6 mm in the case of a tooth root height of 5 mm.

Figure 2:
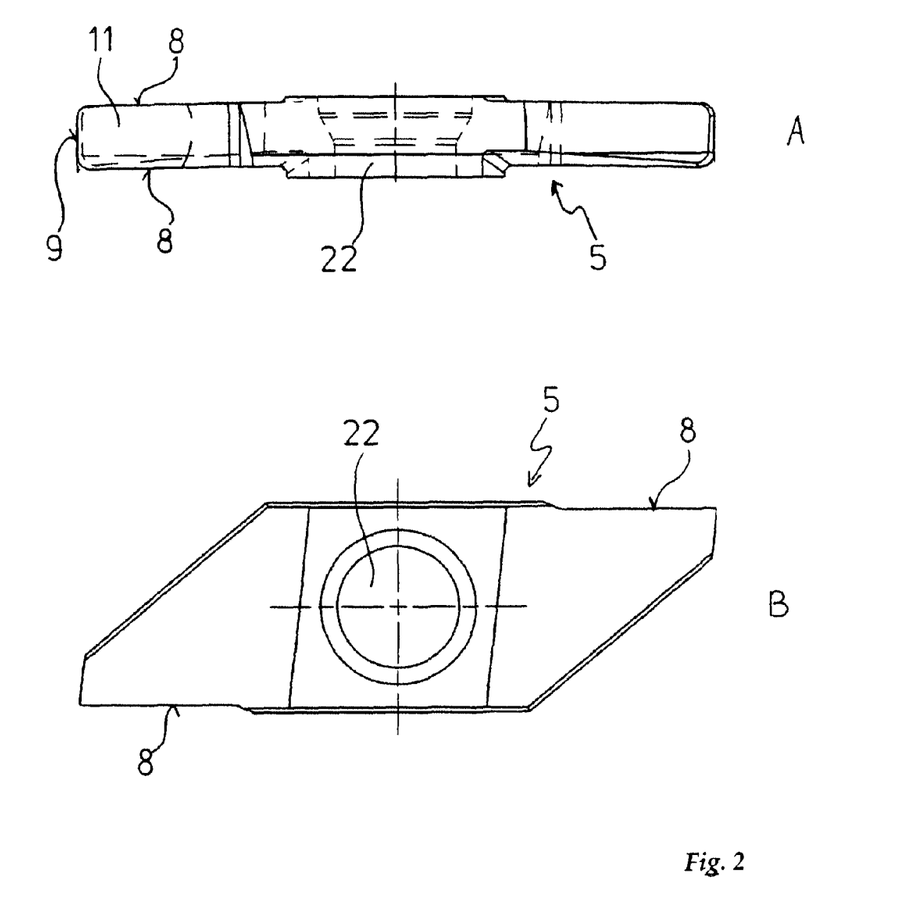

As is also shown in FIG. 2 each cutting insert 5 has parallel cutting edges 8 which are in opposite relationship along a rake surface 11, for the production of the tooth profile surfaces 12a, b; 13a, b and an end cutting edge 9 extending parallel to the milling cutter axis 20, with which the tooth gap bottom 16 is milled, wherein provided at the diametrally opposite end of the parallelogram-shaped cutting insert 5 are identical cutting edges 8, 9 and a rake surface 11. In the plan view onto the rake surface 11 the cutting inserts are of a narrow rectangular cutting edge profile.

It will be clearly seen from FIGS. 1A and C, how the cutting inserts 5 project with their free ends beyond the edge of the cylindrical enlargement 3 of the milling cutter main body 10. In this case the cutting edges 8, 9 respectively extend in a plane perpendicularly to the milling cutter axis and their notional prolongations extend approximately through the milling cutter axis while the secondary cutting edges or end cutting edges 9 extend parallel to the milling cutter axis. Those secondary cutting edges 9 are provided for producing the bottom of a tooth gap.

Figure 4:
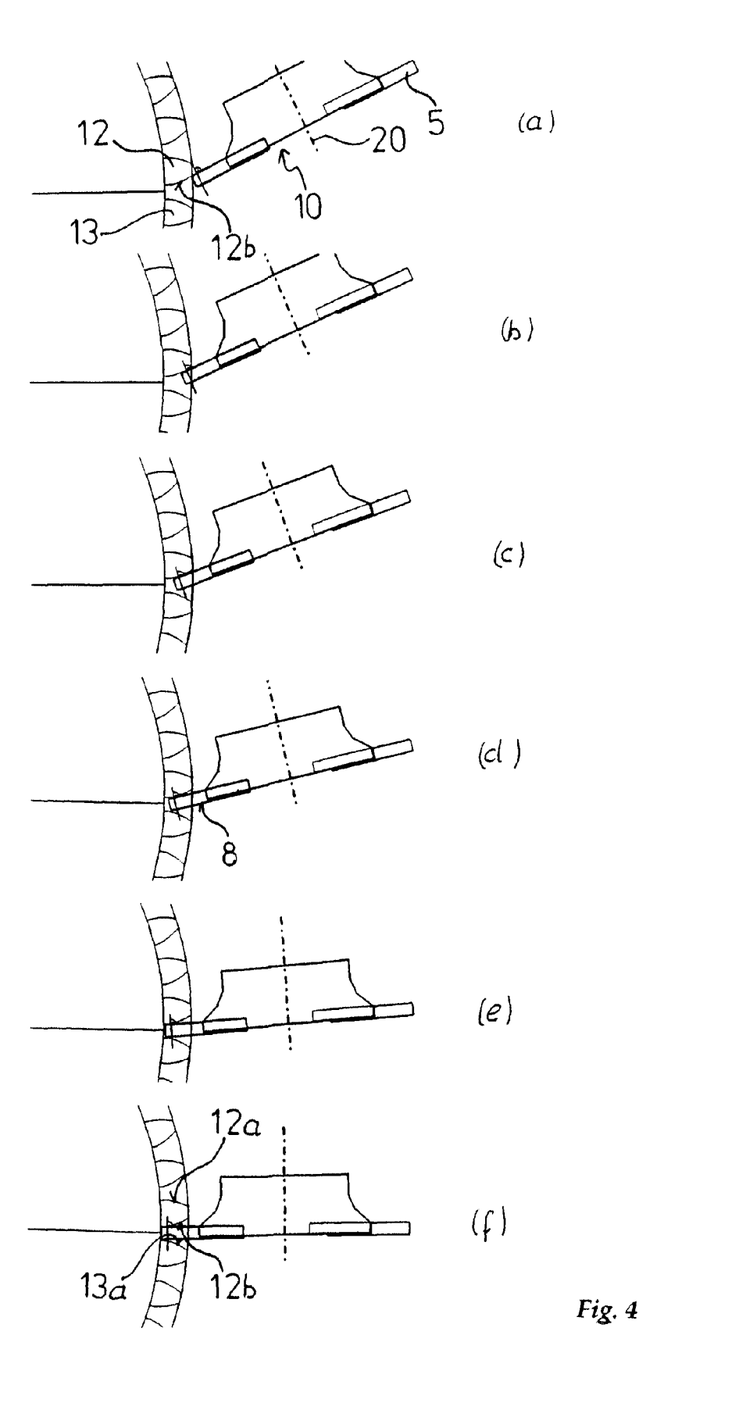

FIGS. 4 to 7 show two alternative methods for the production of the tooth profiles or tooth gaps between adjacent teeth, for example a gear wheel, wherein that would similarly apply to toothed racks and gear wheel segments. In that respect FIG. 4 shows the radial engagement into a peripheral portion of a solid wheel, producing a tooth gap 16 and a tooth gap bottom 16a.

The tooth profile is produced by tilting the milling cutter axis with at the same time a radial feed, as is described hereinafter. FIGS. 3 to 7 always substantially show the same part of a gear wheel portion to be produced and the milling cutter 10 is also always the same, in which respect the same references are also used throughout for the same parts, but on the other hand not all references are shown in all parts of the Figures for the sake of enhanced clarity, but are rather distributed to the individual parts of the Figures.

Figure 3:
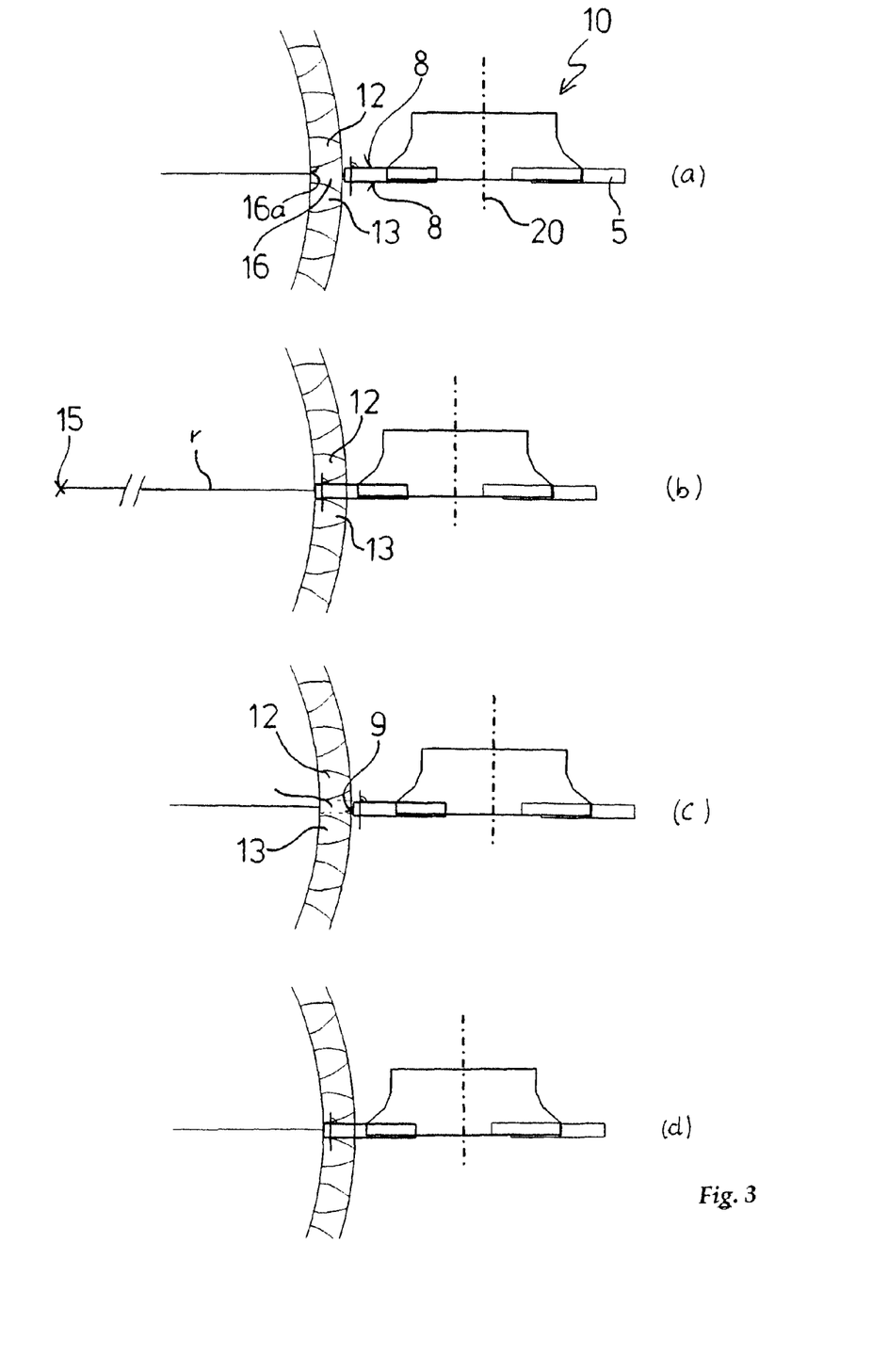

In a first part of the method shown in FIG. 3 the milling cutter 10 as shown in FIG. 3(a) travels in front of the surface of the originally cylindrical gear wheel blank into the region of a tooth gap 16, the cutting edges 8 being oriented parallel to a radial direction with respect to the gear wheel. In step 3(b) the rotating milling cutter 10 moves with its cutting inserts 5 radially to a depth which corresponds to the so-called tooth root height and thus generates a part of the tooth gap 16 and the tooth gap bottom 16a. That operation is repeated in steps 3(c) and (d) at a certain spacing which is less than the width of the rake surface (or the length of the secondary cutting edge 9). That results in a groove with substantially parallel side flanks and of a depth approximately corresponding to the tooth height and of a width which is between one and two times the cutting insert thickness or the rake surface. Because of the necessary relief angle, the width of the rake surface also defines the maximum thickness of the cutting insert behind the cutting edges 8a, 8b. The milling cutter is then moved radially away from the gear wheel and moved into a position along the tooth back, from which the profiling operation is to be begun.

FIG. 4 shows in six individual steps 4(a) to 4(f) how the lower profile 12b of the tooth 12 adjacent to the tooth 13 is produced. During the tilting movement of the milling cutter axis 20 the milling cutter rotates at the same time about that axis 20 and at the same time engages from the outside periphery of the gear wheel into the tooth gap 16 which is partially produced as shown in FIG. 3 so that the lower profile 12b of the tooth 12 is produced in that way. At the same time the upper part of the tooth gap 16 is also completed.

Figure 5:
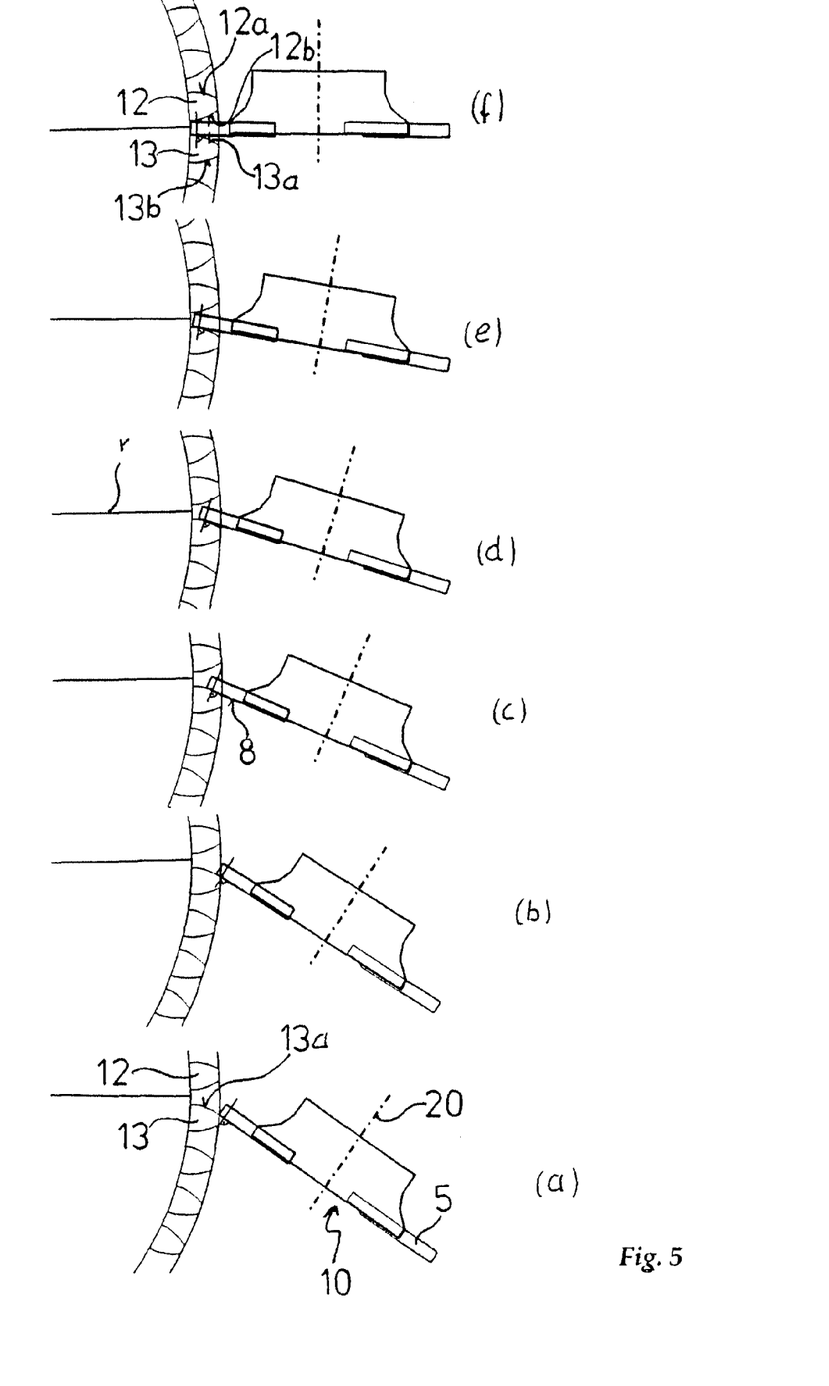

After the profile 12b of the tooth 12 is finished the milling cutter 10 is pulled out of the tooth gap 16 and the milling cutter 10 is pivoted back into a starting position in which the milling cutter axis is pivoted towards the right, with respect to the neutral position, during production of the tooth gap bottom, through approximately the same angle (see FIG. 5(a)), as it was pivoted towards the left in the starting position 4(a) in production of the profile 12b. In accordance with steps 5(a) to 5(f) the profile 13a is also produced, with the tooth gap 16, by return pivotal movement of the milling cutter axis 20 into the vertical orientation, with simultaneous engagement into the tooth gap 16 (and with completion thereof).

In that case the cutting edges 8 are each perpendicular to a normal of the portion of the tooth profile, that is just produced, as is shown in each case by a line at the point of contact between the tooth profile and the cutting edge 8 (see also FIGS. 4(d) and 5(c)). The tooth profile 12b/13a is produced in completely facet-free and uniform fashion by the continuous pivotal movement of the milling cutter axis with simultaneous engagement into the tooth gap 16.

So that both parallel cutting edges 8 of a respective cutting insert can be used in the above-described manner to produce the profiles 12b, 13a, the cutting inserts must project sufficiently far beyond the periphery of the milling cutter main body so that, in production of the profiles 12b and 13a respectively, the milling cutter main body does not strike against the teeth of the gear wheel, which are disposed further upwardly in the views in FIGS. 3 to 5. In the production of tooth configurations on toothed racks, the length of the rack is an important consideration, as to whether the method can be used in that fashion for all teeth or whether only the cutting edge 8 which is at the front can be respectively used for the teeth which are in the centre.

Figure 6:
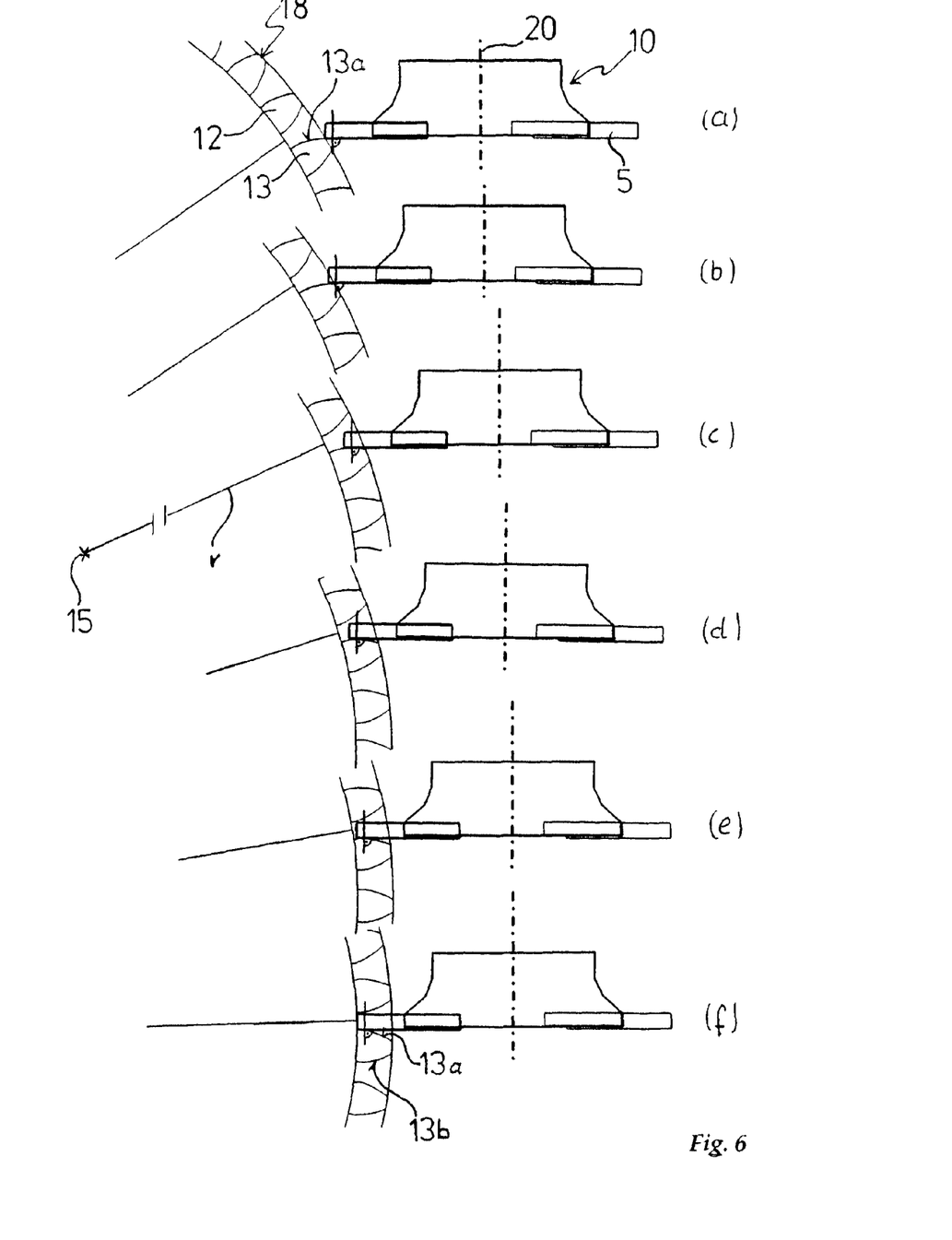
FIGS. 6 and 7 show the preferred diagram for the production of gear wheels by rotation of the gear wheel about its axis with simultaneous translatory movement of the milling cutter axially and radially without tilting of the milling cutter axis in the machine tool according to a second method, FIGS. 8 and 9 diagrammatically show a straight-toothed bevel gear as a perspective view in FIG. 8 and a sectional view in FIG. 9, and FIGS. 10a-c show various views of an alternative milling tool according to the invention.
Figure 7:
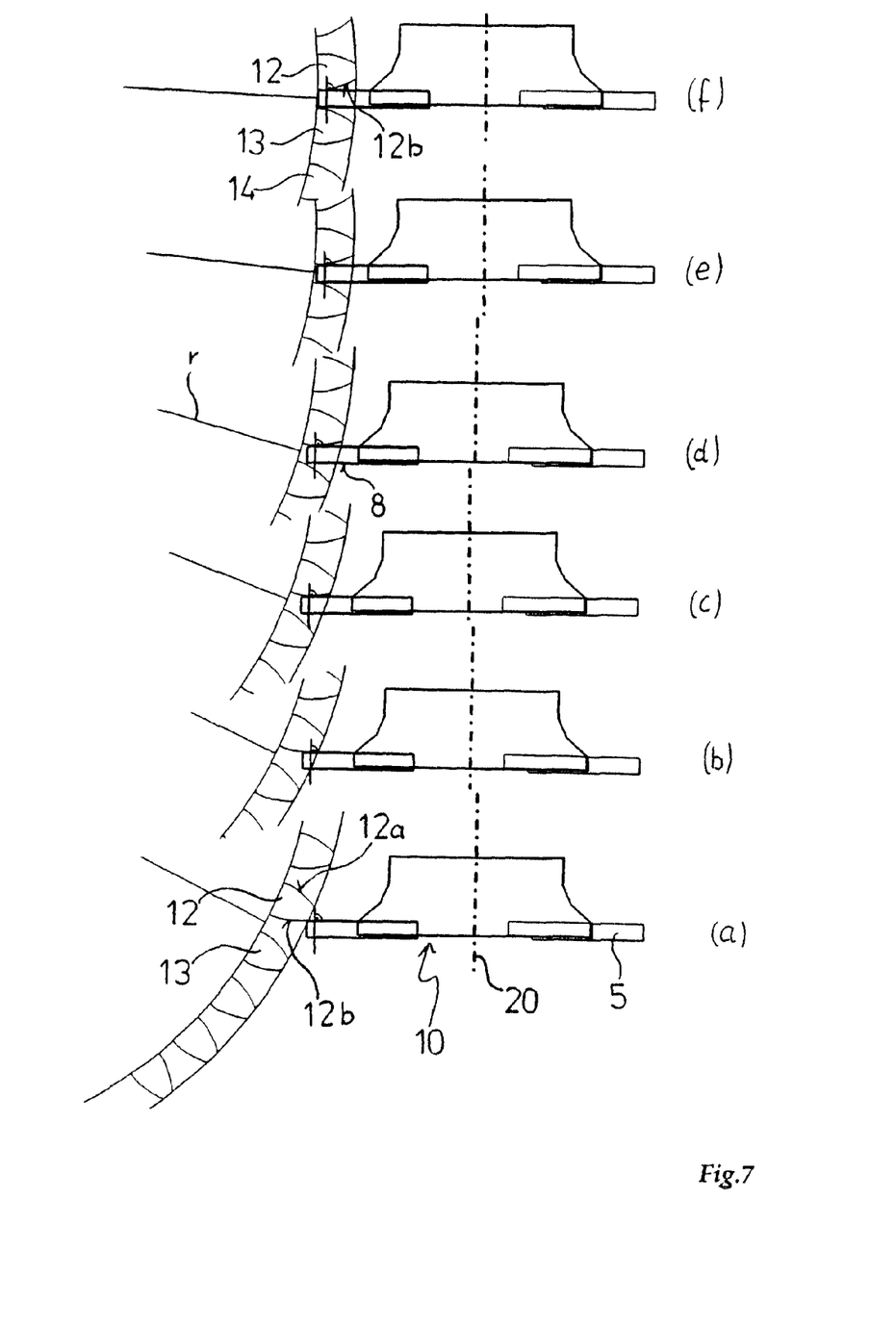

The preferred system for the production of the tooth profiles of toothed gear elements is shown in FIGS. 6 and 7 by the example of a gear wheel 20, wherein that system can also be similarly applied at least to portions of toothed racks, by the respective toothed rack portion being rotated about an imaginary axis on the rear side of the tooth profile, which corresponds to a notional gear wheel axis, wherein the imaginary axis moves with the teeth along the toothed rack in production of the teeth.

Of a gear wheel 18, for example two adjacent teeth 12, 13 with a tooth gap 16 therebetween are shown, whose respective upper profile (in FIGS. 6 and 7) is denoted by references 12a and 13a respectively while the respective lower profile of the teeth 12, 13 is denoted by references 12b and 13b respectively. Firstly, this method also involves producing a first part of the tooth gap 16 in accordance with steps 3(a) to 3(d).

In step 6(a) the gear wheel is rotated somewhat upwardly about its axis and the milling cutter is fed with the cutting circle defined by the cutting inserts radially in the outer region of the tooth 13 in order firstly to begin with the operation of milling the radially outer part of the profile 13a, in that case the gear wheel is rotated downwards again while the milling cutter is moved downwards and at the same time horizontally towards the right (as a result however with a component radially inwardly in the direction of the gear wheel axis 15) in order to mill the radially inner portions of the profile 13a in the steps 6(b) to 6(f) which blend continuously into each other while the milling cutter axis retains its orientation (vertical orientation) in space. The continuous rotation and simultaneous continuous downward and inward movement of the milling cutter in relation to the rotating gear wheel results in a smooth profile without facets. Rotation of the gear wheel and the corresponding tracking movement of the milling cutter are effected until the profile is milled in step 6(f) to the desired depth for the tooth gap 16, possibly with the production of protuberances which can possibly also be in the form of a slight undercut configuration, by the rotation being effected beyond the position shown in 6(f) while the radially outer portions of the cutting inserts 5 remain in engagement with the tooth 13.

Then, after the milling cutter is moved out of the tooth gap, that is followed by a downward rotary movement of the gear wheel about its axis 15, with the milling cutter feed, now with the upper cutting edges 8 that face away from the front end of the milling cutter to the radially outer part of the tooth 12 to produce the profile 12b, then the profile 13a is produced in a similar fashion with upward rotary movement and corresponding axial and radial tracking movement of the milling cutter in the steps 7(a) to 7(f) which continuously blend into each other.

The method is then continued by generating the next groove corresponding to the steps 3(a) to 3(d) between the tooth 13 and the next following tooth 14, where the profiles 14a and 13b are produced in identical fashion, and so forth, until to conclude there is only still the profile 12a that has to be produced to complete the gear wheel.

If the tooth is of an excessive width (=length of the tooth back) in comparison with the cutting circle diameter of the milling cutter, to be produced with one milling operation, the above-described procedure is repeated at one or more different positions in respect of the longitudinal extent of the tooth back.

The method according to the invention makes it possible to produce highly different tooth profiles with one and the same milling cutter, wherein, to produce a desired profile, only the pivotal movement or translatory movement of the milling cutter axis and the simultaneous rotation and/or translatory movement of the gear wheel and/or of the milling cutter main body have to be matched to each other, which however forms part of the routine tasks of a man skilled in the art, with modern multi-axis machine tools and suitable programming.

Accordingly the requirement for using different milling cutters and/or cutting inserts for different tooth profiles ceases to apply, which considerably rationalises and simplifies the production of toothed gear elements.

Figure 8:
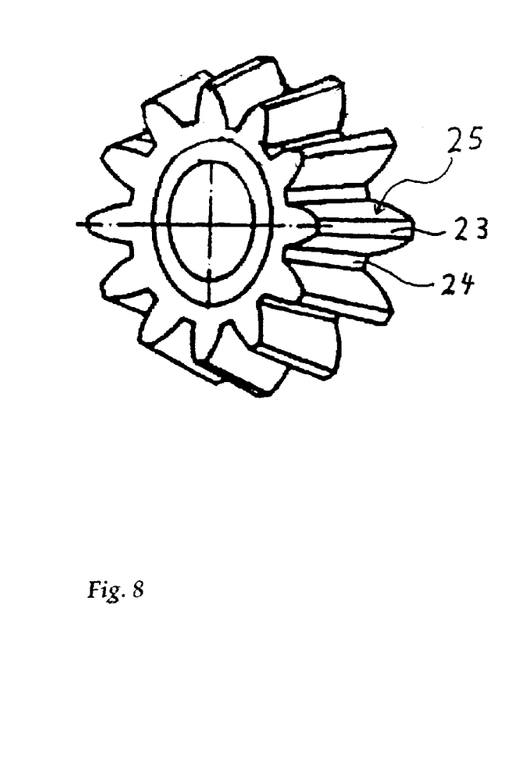
Figure 9:
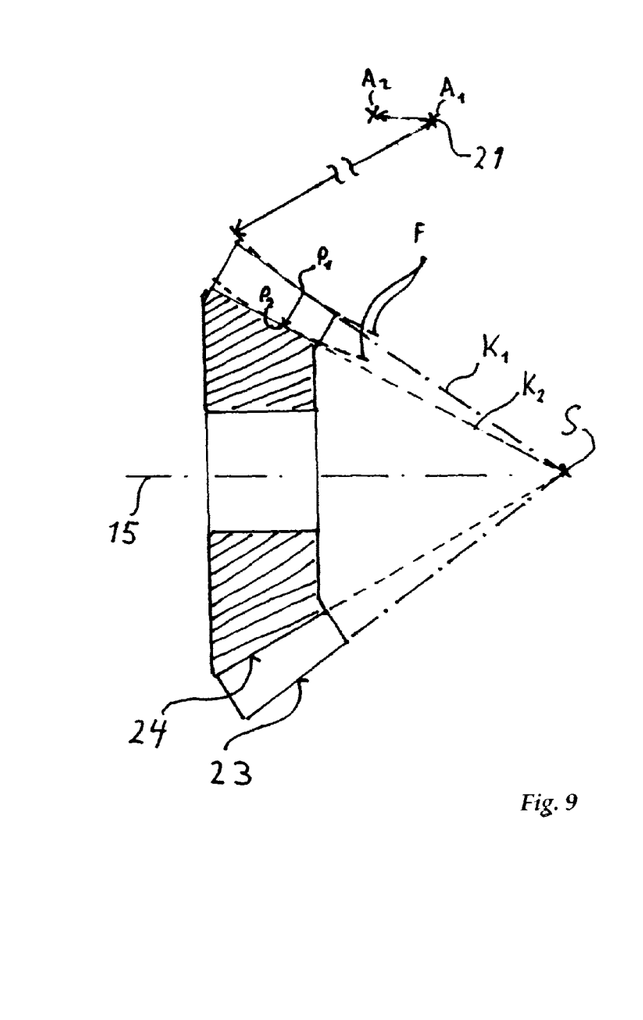

FIGS. 8 and 9 diagrammatically show a straight-toothed bevel gear as a perspective view in FIG. 8 and a sectional view in FIG. 9. As can be seen in particular from FIG. 9 the bevel gear has a conical envelope surface $K_1$ on which all tooth backs 23 jointly lie and also the tooth back surfaces 24 also lie on a common conical surface $K_2$ which has a smaller cone angle so that the notional cone surfaces $K_1$ and $K_2$ have a common tip S which is on the axis 15 of the bevel gear. As can also be seen from FIG. 9 each of the teeth 25 is of a tooth height which decreases from the radially outer region or from the region further away from the conical tip S to the radially inward region or the region closer to the cone tip S. Overall the profile of the teeth 25 narrows, starting from the region remote from the tip S, to the region close to the cone tip S, in the same ratio as the cross-sections of the corresponding cone surfaces at the same positions.

FIG. 9 also diagrammatically shows by two broken lines F the cutting circle defined by the cutting teeth of a milling cutter which mills the tooth profile. The cutting circle is shown at the two extreme points of the tooth, namely at the tooth back 23 where the point of the cutting circle, that is lowest in relation to the tooth profile, is denoted by P1, and again at the tooth bottom where the point of the cutting circle, that is lowest with respect to the tooth profile, is denoted by $P_2$. That lowest point on the cutting circle moves during the milling operation along the arrow from $P_1$ to $P_2$.

In that respect at the same time the bevel gear is rotated about its axis 15 while in addition the axis 21 of the milling cutter, which in the view adopted here extends perpendicularly to the plane of the paper, is displaced from the point $A_1$ to the point $A_2$. It will be appreciated that this displacement is only diagrammatically illustrated here and the precise position of the points $A_1$ and $A_2$ can be determined on the basis of the milling cutter radius and the respective lowest points of the cutting circle profile $P_1$ and $P_2$ respectively.

It will be appreciated that otherwise the tooth profile is produced exactly in the same manner as was already shown in connection with FIGS. 6 and 7, in which respect alternatively it would also be possible to implement a pivotal movement of the milling cutter axis in space, similarly to the view in FIGS. 3 to 5. Only the positioning of the axis 21 in relation to the respective gear wheel blank differs in the case of a bevel gear from the positioning involved with a cylindrical gear wheel, while the actual milling operations and movements of gear wheel and milling cutter or milling cutter axis are substantially similar.

Figure 10:
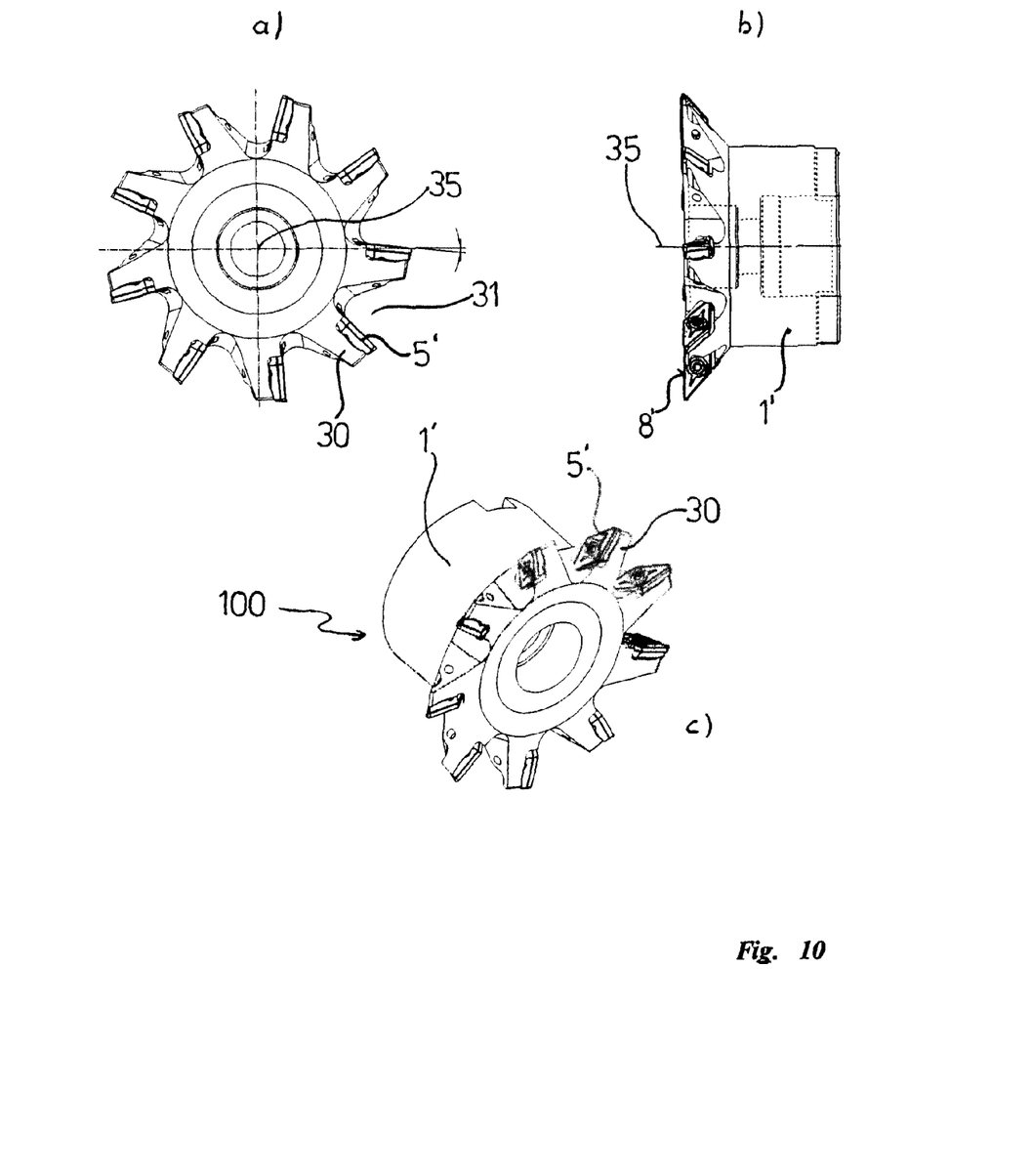

FIG. 10 shows various views of an alternative milling cutter 100. Here too the milling cutter 100 has a main body 1' which in this case is cylindrical, wherein the essential difference in relation to the FIG. 1 milling cutter is less in the main body 1', but rather in the fact that the cutting inserts are mounted not tangentially but radially. In this case also however the cutting inserts 5' have at least one cutting edge 8' extending perpendicularly to the axis 35 of the milling cutter. Here too the cutting inserts 5' or their cutting edges 8' project beyond the periphery of the milling cutter main body 1', more specifically at least by a dimension corresponding to the height of the teeth between the tooth bottom and the tooth gap. By virtue of radial fitment of the cutting inserts however, this arrangement additionally has support fingers 30 which also extend radially beyond the milling cutter main body 1' and support the rear side of the cutting insert 5'. The individual support fingers 30' are separated by chip spaces 31 and at their front side each have a respective receiving pocket for receiving a cutting insert 5'. In this case however the profile of the support finger 30 is narrower than the profile of the respective cutting insert 5', as can be seen in particular in the upper and lower regions of the side view in FIG. 10b. The individual support fingers 30, the cutting inserts 5' mounted at the front side of the support fingers in corresponding receiving pockets and the chip spaces between the support fingers and in front of the cutting inserts 5' can best be seen in the end view in FIG. 10a. FIG. 10c shows a perspective view of the milling cutter 100.

In the case of this milling cutter, only the respective end cutting edge 8' of the cutting inserts 5' which extends perpendicularly to the axis 35 is used. The tip of the rhombic cutting inserts can possibly also have a flattened or inclined configuration which possibly also extends asymmetrically, that is to say perpendicularly to the described cutting edge 8', in order in that way to be able more easily to produce the tooth bottom between adjacent teeth. It will be appreciated that the tooth gaps of the tooth configurations to be produced with such a milling cutter must be sufficiently wide to be able to receive the rhombic cutting inserts 5' including the support fingers 30 if a side of a tooth profile is machined by the cutting edges 8' extending perpendicularly to the axis 35.

For the purposes of the original disclosure it is pointed out that all features as can be seen by a man skilled in the art from the present description, the drawings and the appendant claims, even if they are described in specific terms only in connection with certain other features, can be combined both individually and also in any combinations with others of the features or groups of features disclosed here insofar as that has not been expressly excluded or technical aspects makes such combinations impossible or meaningless. A comprehensive explicit representation of all conceivable combinations of features and emphasis of the independence of the individual features from each other is dispensed with here only for the sake of brevity and readability of the description.

The invention claimed is:

1. A method of milling a row of teeth of a toothed gear element with a straight tooth configuration, with a milling cutter which is rotatable about a milling cutter axis and has at its periphery interchangeable cutting inserts which are so arranged that when the milling cutter is approached to the toothed gear element the cutting inserts engage into the gaps between adjacent teeth or generate those gaps, wherein a milling cutter is used, in which the cutting inserts in their condition of being mounted to the milling cutter have at least one cutting edge extending radially and perpendicularly relative to the milling cutter axis, wherein upon milling of the tooth profile the milling cutter axis is oriented in a plane perpendicularly to the longitudinal extent of the tooth back and during the engagement movement of the cutting inserts which rotate about the milling cutter axis into the surface or tooth gaps of a toothed gear element the milling cutter axis is pivoted in said plane over an angular range which covers the range of all normals to the profile surface of the tooth to be produced, wherein the cutting inserts project radially from the outer periphery of the milling cutter main body and on mutually opposite sides have parallel cutting edges perpendicular to the milling cutter axis, and wherein the mutually opposite cutting edges are respectively used successively for generating the flanks of adjacent teeth, which flanks are in opposite relationship at a tooth gap.

2. A method according to claim 1 wherein during the engagement movement and the pivotal movement of the rotating milling cutter and the cutting inserts the toothed gear element is translatorally displaced in the direction of the row of teeth or is rotated about an axis of the toothed gear element insofar as the toothed gear element is a gear wheel.

3. A method according to claim 1 wherein the cutting inserts additionally have a cutting edge which is disposed in a cylindrical surface around the milling cutter axis and has components parallel to the milling cutter axis, wherein said additional cutting edge is used to generate the tooth gap bottom, by the milling cutter being approached to the gear element radially and perpendicularly to the plane defined by two adjacent tooth backs, wherein the milling cutter axis is respectively disposed perpendicularly to a currently generated surface segment of the tooth profile.

4. A method according to claim 1 wherein the tooth profile delimiting a tooth gap is produced with the following steps:
   a) producing a groove in the cylindrical surface of a gear wheel blank by the milling cutter cutting the surface open with the cutting circle defined by the cutting inserts in a depth corresponding to the tooth height parallel to the axis of the gear wheel,
   b) pulling the milling cutter out of the groove and feeding it in an axial position of the tooth back along which the profile is to be produced at the tip of a tooth delimiting the groove or a corresponding tooth gap, wherein the gear wheel is rotated into a position and the milling cutter is correspondingly tracked therewith so that the cutting edges of the milling cutter are perpendicular to a normal to the radially outward end portion of the profile, and
   c) rotating the gear wheel and simultaneously tracking the milling cutter by axial and radial translation, wherein the milling cutter axis retains its orientation in space and the profile of the tooth is continuously produced.

5. A method according to claim 1 wherein the process of engagement movement and pivotal movement is repeated in at least one further plane parallel to the first plane.

6. A method according to claim 1 wherein the tooth back extends on a conical surface which is inclined relative to the axis of the conical surface.

7. A method according to claim 6 wherein the angle of the conical surface, that is measured relative to the cone axis, is between 0 and 90°.

8. A method according to claim 6 comprising the following steps:
   a) producing a groove in the conical surface of a gear wheel blank by the milling cutter cutting the surface open with the cutting circle defined by the cutting inserts in a depth corresponding to the tooth height at an angle of inclination to the cone axis, that corresponds to the cone angle of the tooth bottom of a bevel gear to be produced,
   b) pulling the milling cutter out of the groove and feeding the milling cutter cutting circle in an axial position of the tooth back at which the profile is to be produced at the tip of a tooth delimiting the groove or a corresponding tooth gap, wherein the gear wheel is rotated about the cone axis and the milling cutter is correspondingly tracked therewith so that the cutting edges of the milling cutter are perpendicular to a normal to the radially outward end portion of the profile, and
   c) rotating the gear wheel and simultaneously tracking the milling cutter by axial and radial translation, with respect to the milling cutter axis retains its orientation in space and the profile of the tooth is continuously produced.

9. A method according to claim 8 wherein the axial and radial translation of the milling cutter, that is related to the milling cutter axis, corresponds to a circular movement about a cone tip, lying on the cone axis, of the cone surfaces of the bevel gear to be produced, wherein the milling cutter axis respectively extends parallel to a tangent to the cone surface.

10. A milling cutter for producing tooth profiles by a method according to claim 1 comprising a rotatable, rotationally symmetrical main body and recesses at a periphery of the main body, in which cutting inserts are received,
   wherein the cutting inserts have cutting edges which are disposed in a radial plane and which extend radially and which extend in the radial direction by at least 6 mm beyond the peripheral surface of the portion of the main body, that has the recesses.

11. A cutting insert for a milling cutter according to claim 10 wherein the cutting insert is in the form of a tangential reversible cutting insert which in the plan view onto the relief surface is of an elongate parallelogram shape of a length exceeding the width by at least twice and having a central fixing bore, wherein the edge of the fixing bore is at a spacing of at least 12 mm from the ends in the longitudinal direction of the parallelogram.

12. A cutting insert according to claim 11 wherein the cutting insert over at least 8 mm of its cutting portions provided at the longitudinal ends of the parallelogram has a tangential rake surface with two parallel cutting edges and relief surfaces adjoining same, which include an angle of less than 90 degrees with the rake surface.

13. A method of milling a row of teeth of a toothed gear element with a straight tooth configuration, wherein the toothed gear element is a bevel gear, comprising a milling cutter which is rotatable about a milling cutter axis and has at its periphery interchangeable cutting inserts which are so arranged that when the milling cutter is approached to the toothed gear element the cutting inserts engage into the gaps between adjacent teeth or generate those gaps, wherein a milling cutter is used, in which the cutting inserts in their condition of being mounted to the milling cutter have at least one cutting edge extending radially and perpendicularly relative to the milling cutter axis,
   wherein upon milling of the tooth profile the milling cutter axis is oriented in a plane perpendicularly to an edge of a tooth back, that delimits the desired profile surface, and during the engagement movement of the cutting inserts which rotate about the milling cutter axis into the surface or tooth gaps of a toothed gear element the milling cutter axis is pivoted in said plane over an angular range which covers the range of all normals to the profile surface of the tooth to be produced.

14. A method according to claim 7 wherein the angle of the conical surface that is measured relative to the cone axis is between 10° and 80°.

15. A method of milling a row of teeth of a toothed gear element with a straight tooth configuration with a milling cutter that is rotatable about a milling cutter axis and has at its periphery interchangeable cutting inserts which are so arranged that, when the milling cutter is approached to the toothed gear element, the cutting inserts engage into gaps between adjacent teeth or generate those gaps, the method comprising:
   mounting the cutting inserts on the milling cutter with at least one cutting edge extending radially and perpendicularly relative to the milling cutter axis;
   orienting the milling cutter axis in a plane perpendicularly to the longitudinal extent of the tooth back; and
   during the engagement movement of the cutting inserts which rotate about the milling cutter axis into the surface or tooth gaps of a toothed gear element, pivoting the milling cutter in said plane over an angular range which covers the range of all normals to the profile surface of the tooth to be produced, wherein the cutting inserts project radially from the outer periphery of the milling cutter main body and on mutually opposite sides have parallel cutting edges perpendicular to the milling cutter axis, and wherein the mutually opposite cutting edges are respectively used successively for generating the flanks of adjacent teeth, which flanks are in opposite relationship at a tooth gap.

16. A method according to claim 13 wherein the cutting inserts project radially from the outer periphery of the milling cutter main body and on mutually opposite sides have parallel cutting edges perpendicular to the milling cutter axis, and wherein the mutually opposite cutting edges are respectively used successively for generating the flanks of adjacent teeth, which flanks are in opposite relationship at a tooth gap.

* * * * *